US012692138B2

(12) United States Patent
Hung

(10) Patent No.: US 12,692,138 B2
(45) Date of Patent: Jul. 28, 2026

(54) PNEUMATIC DISMANTLING DEVICE

(71) Applicant: SOARTEC INDUSTRIAL CORP., Taichung City (TW)

(72) Inventor: Pei-Chin Hung, Taichung City (TW)

(73) Assignee: SOARTEC INDUSTRIAL CORP., Taichung City (TW)

( * ) Notice: Subject to any disclaimer, the term of this patent is extended or adjusted under 35 U.S.C. 154(b) by 361 days.

(21) Appl. No.: 18/531,905

(22) Filed: Dec. 7, 2023

(65) Prior Publication Data

US 2025/0187882 A1 Jun. 12, 2025

(51) Int. Cl.

*B66F 3/24* (2006.01)
*B25B 27/00* (2006.01)

(52) U.S. Cl.

CPC .......... *B66F 3/247* (2013.01); *B25B 27/0035* (2013.01)

(58) Field of Classification Search

CPC . B25B 27/026; B25B 27/0035; B25B 27/023; F02M 61/14; B25D 17/24; B25D 2250/171; B25D 9/08; B66F 3/247
USPC ........................................................... 29/252
See application file for complete search history.

(56) References Cited

U.S. PATENT DOCUMENTS

| | | | | |
|---|---|---|---|---|
| 7,198,116 B1 * | 4/2007 | Chen | B25B 21/02 173/208 |
| 2008/0216608 A1 * | 9/2008 | Schuchardt | B25B 27/062 81/52 |
| 2010/0139940 A1 * | 6/2010 | Kobayashi | B25D 9/18 173/162.2 |

FOREIGN PATENT DOCUMENTS

| | | | | |
|---|---|---|---|---|
| CN | 115488817 A * | 12/2022 | B25B 27/026 |
| DE | 202022105089 U1 * | 10/2022 | B25B 27/04 |
| EP | 4397852 A1 * | 7/2024 | B25B 27/026 |
| KR | 20100002982 U * | 3/2010 | B25B 27/0035 |
| TW | 1806734 B * | 6/2023 | |
| TW | 1828430 B * | 1/2024 | |

OTHER PUBLICATIONS

Balaguer—We tested the pneumatic diesel injector extractor found at: https://www.youtube.com/watch?v=QcndpO8ST7A (Year: 2025).*
Diesel Air Injector Puller Kit—Soartec WS-406 Tool Test found at: https://www.youtube.com/watch?v=MIGQ4rlqKqg (Year: 2025).*
Soartec Products found at: https://www.soartectools.com/products/air-diesel-engine-injector-removal-puller-ws-406?_pos=1&_sid=84195bbfb&_ss=r (Year: 2026).*
Sterl-Diesel Injector Air Hammer Removal Tool Test found at: https://www.youtube.com/watch?v=5mugvoXBszQ (Year: 2021).*

* cited by examiner

*Primary Examiner* — Mahdi H Nejad
(74) *Attorney, Agent, or Firm* — MUNCY, GEISSLER, OLDS & LOWE, P.C.

(57) ABSTRACT

A pneumatic dismantling device includes a main body and a dismantling assembly. The main body includes a compartment space, a chamber, an air intake portion and an assembling portion. An end of the compartment space is closed by a radial wall, and the radial wall and the main body are integrally formed of one piece. The chamber is between the compartment space and the assembling portion. A hammer block is slidably assembled to the compartment space. A valve body is disposed in the chamber. The air intake portion is in communication with the chamber. The dismantling assembly includes a position-limiting member and a connection member. The connection member is configured to be assembled with a dismantling tool.

10 Claims, 5 Drawing Sheets

PNEUMATIC DISMANTLING DEVICE

BACKGROUND OF THE INVENTION

Field of the Invention

The present invention relates to a pneumatic dismantling device.

Description of the Prior Art

Generally, a lever (crowbar or pinch bar) is often used in the dismantling operation to lift the object to be dismantled in the industry. However, in the dismantling operation, the lever has to be abutted against the base on which the object to be dismantled is disposed, so it is easy damage the base due to the levering operation of the lever. If the dismantling operation is carried out by hand but not carried out by using a lever, it is very laborious and inefficient.

The present invention is, therefore, arisen to obviate or at least mitigate the above-mentioned disadvantages.

SUMMARY OF THE INVENTION

The main object of the present invention is to provide a pneumatic dismantling device, which is labor-saving and easy to use and operate.

To achieve the above and other objects, a pneumatic dismantling device is provided, including: a main body, including a compartment space, a chamber, an air intake portion and an assembling portion, an end of the compartment space being closed by a radial wall, the radial wall and the main body being integrally formed of one piece, the chamber being located between and in communication with the compartment space and the assembling portion, an end of the chamber opposite to the radial wall being closed by the assembling portion, a hammer block being slidably received in the compartment space, a valve body being disposed in the chamber, the air intake portion being in communication with the chamber, the air intake portion being configured to be in communication with a high pressure gas source to make the valve body on or off reciprocatingly so that the hammer block is driven by the high pressure gas source to reciprocate in the compartment space; a disassembling assembly, including a position-limiting member and a connection member, the connection member being rotatably assembled to the assembling portion and isolated from the chamber by the assembling portion, the position-limiting member being assembled to the assembling portion and blocking the connection member, the connection member being configured to be assembled with a dismantling tool.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
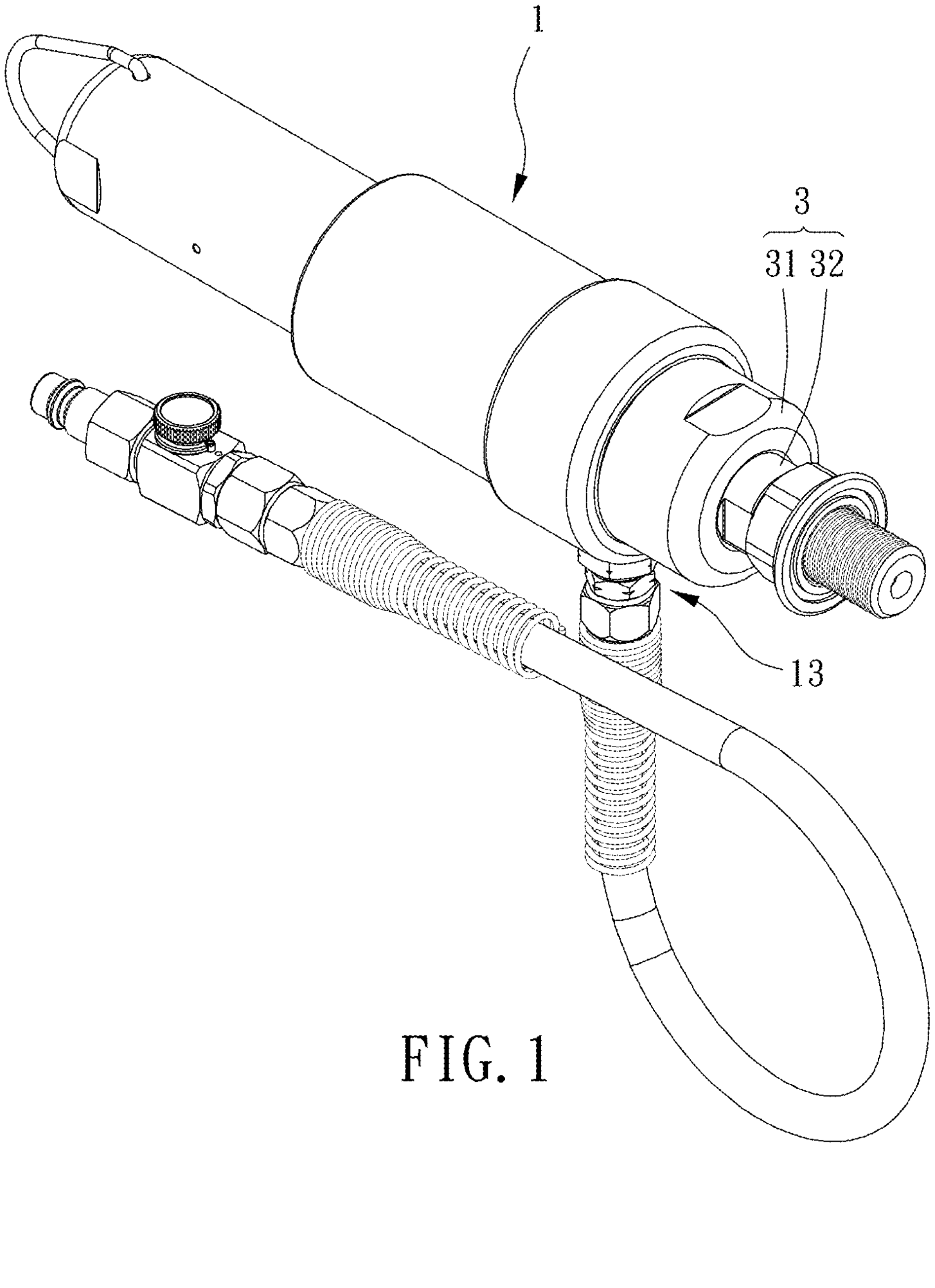
FIG. 1 is a stereogram of a preferable embodiment of the present invention.
Figure 2:
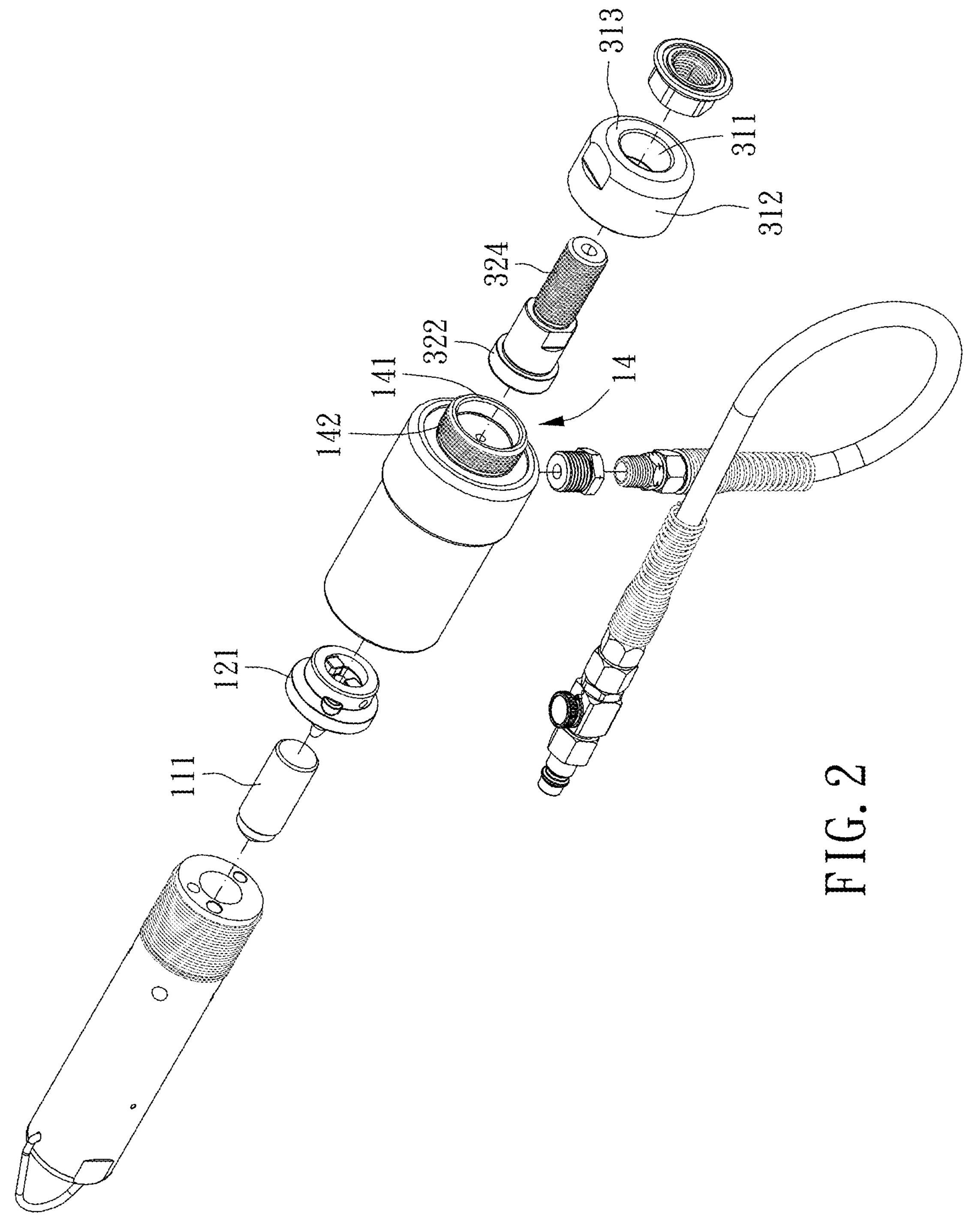
FIG. 2 is a breakdown drawing of a preferable embodiment of the present invention.
Figure 3:
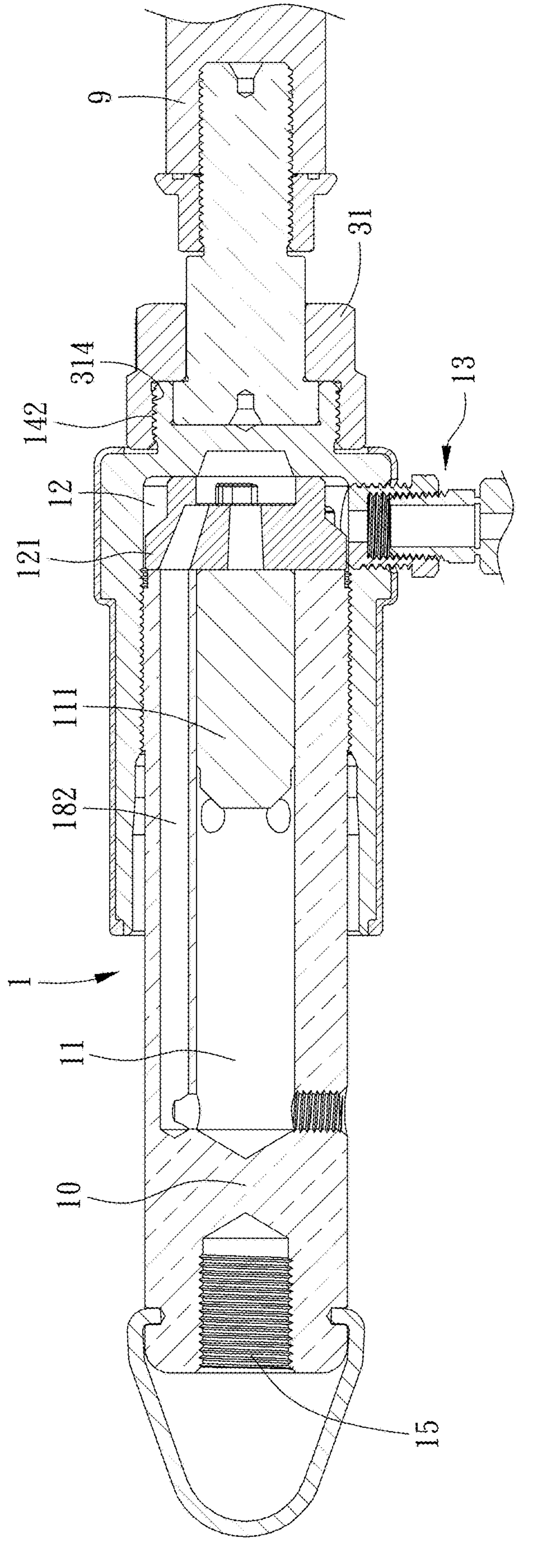
FIG. 3 is a cross-sectional view of a preferable embodiment of the present invention.
Figure 4:
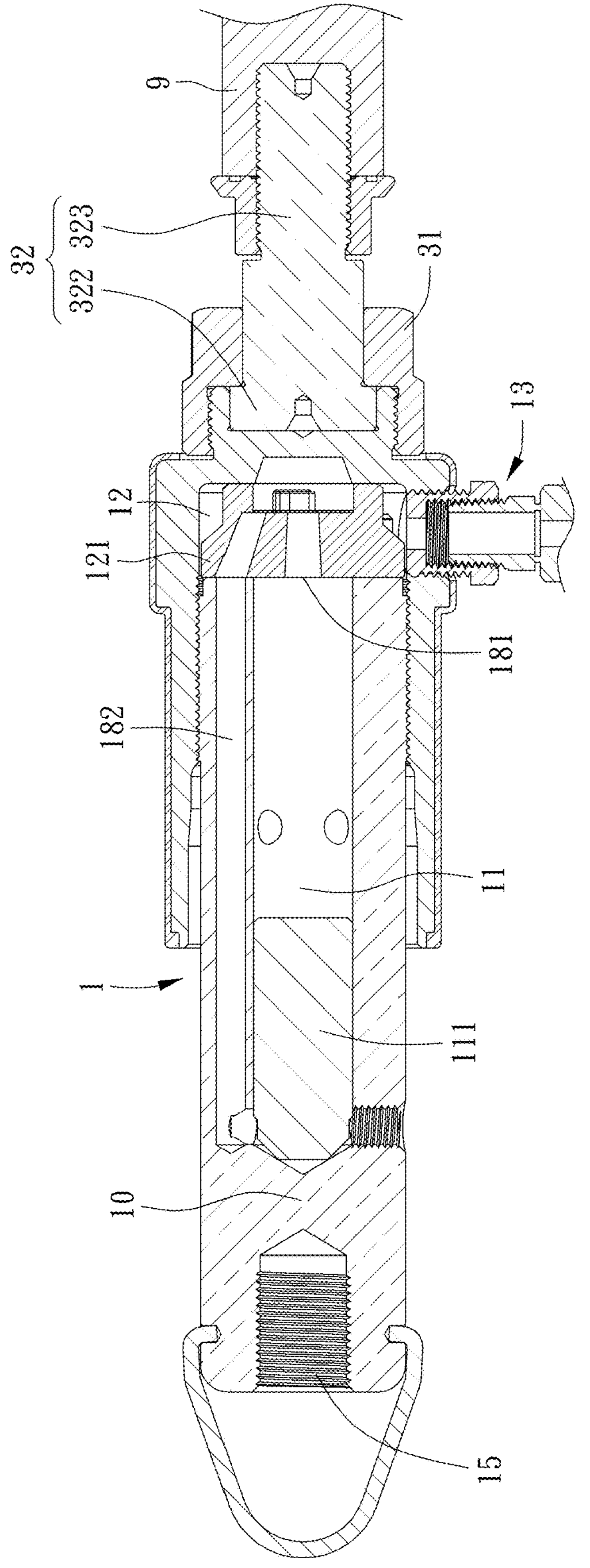
FIG. 4 is another partial cross-sectional view of a preferable embodiment of the present invention.
Figure 5:
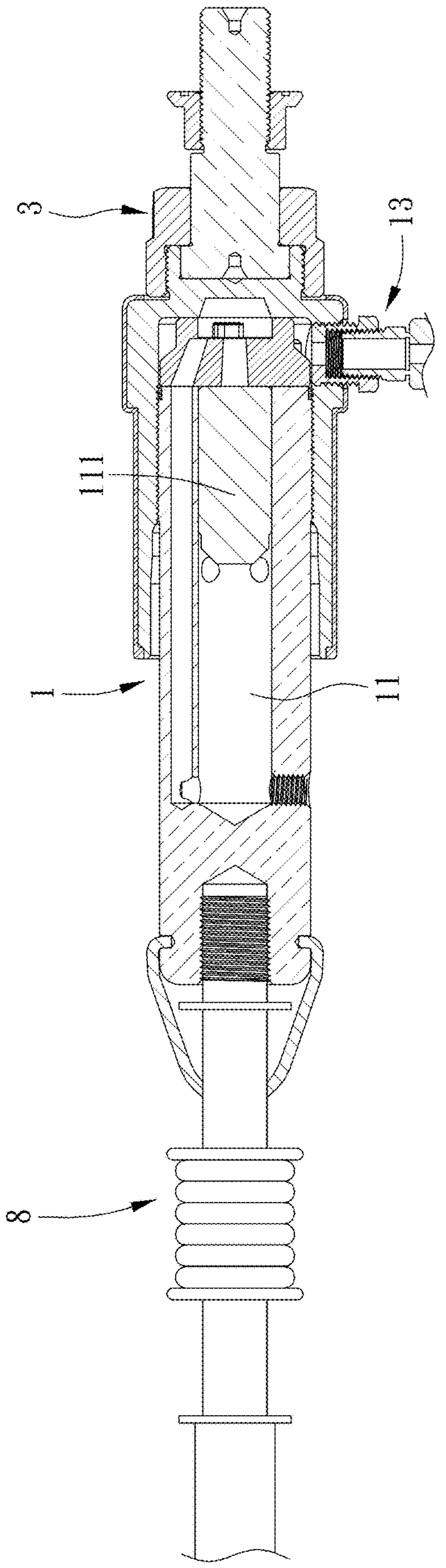
FIG. 5 is a drawing showing application of a pneumatic dismantling device of a preferable embodiment of the present invention.

Please refer to FIGS. 1 to 5 for a preferable embodiment of the present invention. A pneumatic dismantling device of the present invention includes a main body 1 and a disassembling assembly 3.

The main body 1 includes a compartment space 11, a chamber 12, an air intake portion 13 and an assembling portion 14. An end of the compartment space 11 is closed by a radial wall 10, the radial wall 10 and the main body 1 are integrally formed of one piece, so that it can effectively prevent leakage of gas from the compartment space 11. The chamber 12 is located between and in communication with the compartment space 11 and the assembling portion 14, an end of the chamber 12 opposite to the radial wall 10 is closed by the assembling portion 14, a hammer block 111 is slidably received in the compartment space 11, a valve body 121 is disposed in the chamber 12, and the air intake portion 13 is in communication with the chamber 12. The air intake portion 13 is configured to be in communication with a high pressure gas source to make the valve body 121 on or off reciprocatingly so that the hammer block 111 is driven by the high pressure gas source to reciprocate in the compartment space 11, for providing reciprocating impact output.

The disassembling assembly 3 includes a position-limiting member 31 and a connection member 32, the connection member 32 is rotatably assembled to the assembling portion 14 and isolated from the chamber 12 by the assembling portion 14, the position-limiting member 31 is assembled to the assembling portion 14 and blocks the connection member 32, and the connection member 32 is configured to be assembled with a dismantling tool 9 or an object to be dismantled.

In this embodiment, the main body 1 includes a first intake passage 181 and a second intake passage 182, the first intake passage 181 is in communication with an end of the compartment space 11 facing toward the assembling portion 14, the second intake passage 182 is in communication with a side of the compartment space 11, the valve body 121 is reciprocatable to control the first intake passage 181 and the second intake passage 182 to be in communication with the air intake portion 13 alternatively, so that the hammer block 111 can reciprocate.

In use, the connection member 32 is assembled to a dismantling tool 9, and the dismantling tool 9 is configured for being assembled with an object to be dismantled. The hammer block 111 can reciprocate to provide reciprocating impact force for dismantling the object to be dismantled, and thus it is labor-saving and easy to use and operate.

Specifically, the assembling portion 14 includes a first annular wall 141 projecting in a direction away from the compartment space 11, the first annular wall 141 is disposed around the connection member 32, the connection member 32 is rotatable relative to the first annular wall 141, and the position-limiting member 31 is assembled to the first annular wall 141. Since connection member 32 is rotatable relative to the first annular wall 141, it avoids that the dismantling tool 9 is rotated with the main body 1 so that it prevents the object to be dismantled from being damaged.

The first annular wall 141 includes a first outer threaded portion 142, and the position-limiting member 31 includes an inner threaded portion 314 screwed with the first outer threaded portion 142, which is easy to assemble/disassemble and replace the position-limiting member 31.

Specifically, the connection member 32 includes a head portion 322 and an insertion portion 323 having a diametric dimension smaller than a diametric dimension of the head portion 322, the head portion 322 is rotatably received in the assembling portion 14, the position-limiting member 31 includes a through hole 311, and the insertion portion 323 is disposed through the through hole 311 and protrusive beyond the position-limiting member 31. The head portion 322 is blocked by the position-limiting member 31 so that the connection member 32 is prevented from detaching from the assembling portion 14. In this embodiment, the position-limiting member 31 includes a second annular wall 312 and a blocking wall 313, the blocking wall 313 includes the through hole 311, the second annular wall 312 includes the inner threaded portion 314, and the blocking wall 313 is configured to block the head portion 322.

Preferably, the insertion portion 323 further includes a second outer threaded portion 324, and the second outer threaded portion 324 is configured to be screwed with the dismantling tool 9 so that the dismantling tool 9 is secured to the insertion portion 323 firmly.

An end of the main body 1 remote from the assembling portion 14 includes an assembling hole 15, and the assembling hole 15 and the compartment space 11 are partitioned by the radial wall 10. In this embodiment, the assembling hole 15 is a threaded hole and may be assembled with an object 8, such as an impacting tool or an article to be dismantled.

The air intake portion 13 extends in a direction transverse to a direction in which the compartment space 11 extends.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pneumatic dismantling device, including:

a main body, including a compartment space, a chamber, an air intake portion and an assembling portion, a first end of the compartment space being closed by a radial wall, the radial wall and the main body being integrally formed of one piece, the chamber being located between and in communication with the compartment space and the assembling portion, an end of the chamber opposite to the radial wall being closed by the assembling portion, a hammer block being slidably received in the compartment space, a valve body being disposed in the chamber, the air intake portion being in communication with the chamber, the air intake portion being configured to be in communication with a high pressure gas source to make the valve body on or off reciprocatingly so that the hammer block is driven by the high pressure gas source to reciprocate in the compartment space;

a disassembling assembly, including a position-limiting member and a connection member, the connection member being rotatably assembled to the assembling portion and isolated from the chamber by the assembling portion, the position-limiting member being assembled to the assembling portion and blocking the connection member, the connection member being configured to be assembled with a dismantling tool.

2. The pneumatic dismantling device of claim 1, wherein the assembling portion includes a first annular wall projecting in a direction away from the compartment space, the first annular wall is disposed around the connection member, the connection member is rotatable relative to the first annular wall, and the position-limiting member is assembled to the first annular wall.

3. The pneumatic dismantling device of claim 2, wherein the first annular wall includes a first outer threaded portion, and the position-limiting member includes an inner threaded portion screwed with the first outer threaded portion.

4. The pneumatic dismantling device of claim 1, wherein the connection member includes a head portion and an insertion portion having a diametric dimension smaller than a diametric dimension of the head portion, the head portion is rotatably received in the assembling portion, the position-limiting member includes a through hole, the insertion portion is disposed through the through hole and protrusive beyond the position-limiting member, and the head portion is blocked by the position-limiting member.

5. The pneumatic dismantling device of claim 4, wherein the insertion portion includes a second outer threaded portion, and the second outer threaded portion is configured to be screwed with the dismantling tool.

6. The pneumatic dismantling device of claim 1, wherein an end of the main body remote from the assembling portion includes an assembling hole, and the assembling hole and the compartment space are partitioned by the radial wall.

7. The pneumatic dismantling device of claim 6, wherein the assembling hole is a threaded hole.

8. The pneumatic dismantling device of claim 1, wherein the air intake portion extends in a direction transverse to a direction in which the compartment space extends.

9. The pneumatic dismantling device of claim 1, wherein the main body further includes a first intake passage and a second intake passage, the first intake passage is in communication with a second end of the compartment space facing toward the assembling portion, the second intake passage is in communication with a side of the compartment space, the valve body is reciprocatable to control the first intake passage and the second intake passage to be in communication with the air intake portion alternatively.

10. The pneumatic dismantling device of claim 3, wherein the connection member includes a head portion and an insertion portion having a diametric dimension smaller than a diametric dimension of the head portion, the head portion is rotatably received in the assembling portion, the position-limiting member includes a through hole, the insertion portion is disposed through the through hole and protrusive beyond the position-limiting member, and the position-limiting member is blocked by the head portion; the insertion portion includes a second outer threaded portion, and the second outer threaded portion is configured to be screwed with the dismantling tool; the first end of the compartment space remote from the assembling portion includes an assembling hole, and a cover detachably covers the assembling hole; an end of the main body remote from the assembling portion includes a third outer threaded portion, the cover is screwed with the third outer threaded portion, and at least one pin is disposed through the cover and abutted radially against the main body; the air intake portion extends in a direction transverse to a direction in which the compartment space extends; the main body further includes a first intake passage and a second intake passage, the first intake passage is in communication with the second end of the compartment space facing toward the assembling portion, the second intake passage is in communication with a side of the compartment space, the valve body is reciprocatable to control the first intake passage and the second intake passage to be in communication with the air intake portion alternatively; the position-limiting member includes a second annular wall and a blocking wall, the blocking wall includes the through hole, and the second annular wall includes the inner threaded portion.

* * * * *